UNITED STATES PATENT OFFICE.

CLAYTON W. BEDFORD, OF AKRON, OHIO, ASSIGNOR TO THE GOODYEAR TIRE & RUBBER COMPANY, OF AKRON, OHIO, A CORPORATION OF OHIO.

ART OF RECLAIMING RUBBER.

1,321,501.

Specification of Letters Patent. Patented Nov. 11, 1919.

No Drawing. Application filed April 13, 1918. Serial No. 228,375.

*To all whom it may concern:*

Be it known that I, CLAYTON W. BEDFORD, a citizen of the United States, residing at Akron, in the county of Summit and State of Ohio, have invented a new and useful Improvement in the Art of Reclaiming Rubber, of which the following is a specification.

My invention is directed to the art of reclaiming rubber and will be fully understood from the following specification. It is characteristic of all commercially used reclaiming processes that the protein content of the finished product is lower than that of a similar product made from fresh stock. This result follows probably both from the fact that a certain proportion of the natural proteid constituents become chemically altered during the original vulcanization process so that they are no longer effective upon the second vulcanization of the reclaimed product, and from the circumstance that in the reclaiming process reagents, such as alkali or acid solutions, are employed which first hydrolyze and then wash out a considerable proportion of the protein.

I have discovered that superior results both from the standpoint of the quality and of the aging properties of the vulcanized product made from reclaimed stock may be attained by a procedure which will raise the protein content of the reclaimed stock to a percentage approximating that of natural rubber. There are four ways in which this result may be attained, as follows:

1. Adding a proper proportion of a suitable protein, as, for example, animal glue, up to five per cent. by weight, to the original compound, the reclaiming of which, after the first vulcanization and use for its normal life, is contemplated. Thus, for example, in the production of pneumatic tires from fresh stock it is contemplated to include in the original mix to be vulcanized the named percentage of proteid, so that the worn tires when returned to the maker at the end of their useful life may constitute a stock from which a superior reclaimed rubber may be produced. Any of the ordinary reclaiming processes, either acid or alkali, may be employed, and it will be found that the reclaimed stock and the vulcanized products produced therefrom will be of superior quality and superior aging characteristics as compared with similar reclaimed products made from vulcanized rubber compositions, in the original manufacture of which proteid had not been added.

2. A second method of procedure is to add to the stock to be reclaimed the proper named proportion of protein, mixing the same up with the stock during the milling process, and before treatment with the reclaiming agent. This procedure may, of course, be employed for the reclaiming of miscellaneous stock, in the original production of which the precaution as to the addition of protein was not followed.

3. A third procedure which will also result in the beneficial raising of the protein content of the reclaimed product is to employ a reclaiming solution, for example, a 7½ per cent. caustic soda solution, having in solution or subdivision therein a proper proportion of the protein. The latter will here be initially hydrolyzed and partially decomposed before as well as during the reclaiming action, and there will remain in the devulcanized product a proportion of the proteid higher than would normally be found therein.

4. The fourth method of procedure by which the beneficial results of the higher protein content are to be obtained is the direct addition to the reclaimed devulcanized stock of, for example, five per cent. of animal glue in finely divided form and preferably in the form of a gel, the water content of which is to be removed before the vulcanizing operation, as by vacuum or air drying of the mix.

From the foregoing it will be understood that by the various methods of procedure described, each of which will be adapted for use under certain conditions, it is possible to obtain a vulcanized product made from reclaimed rubber stock which will be markedly superior to the similar products now obtainable.

What I claim is—

1. In the manufacture of rubber, the method which consists in adding proteid to a fresh rubber stock prior to the vulcanization thereof, vulcanizing the fresh product, reclaiming the vulcanized product and re-vulcanizing the reclaimed product.

2. In the manufacture of rubber, the method which consists in adding proteid to a fresh rubber stock prior to the vulcanization thereof, vulcanizing the fresh product, reclaiming the vulcanized product and revulcanizing the reclaimed product, the amount of proteid initially added being sufficient to raise the proteid contents of the reclaimed product to that normally contained in a natural rubber product.

3. In the manufacture of rubber, the method which consists in adding 5% of proteid to a fresh rubber stock prior to the vulcanization thereof, vulcanizing the fresh product, reclaiming the vulcanized product and revulcanizing the reclaimed product.

4. A vulcanized reclaimed rubber product having a proteid percentage equal to that of a vulcanized product made from fresh rubber stock.

CLAYTON W. BEDFORD.